United States Patent [19]

Holmbo et al.

[11] Patent Number: 5,001,549

[45] Date of Patent: Mar. 19, 1991

[54] TELEVISION SIGNAL GENERATOR

[75] Inventors: Dennis L. Holmbo, Beaverton; Bruce J. Penney, Portland, both of Oreg.; John C. Reynolds, Vancouver, Wash.

[73] Assignee: Tektronix, Inc., Beaverton, Oreg.

[21] Appl. No.: 236,278

[22] Filed: Aug. 23, 1988

Related U.S. Application Data

[63] Continuation of Ser. No. 908,553, Sep. 17, 1986, abandoned.

[51] Int. Cl.$^5$ .............................................. H04N 9/68
[52] U.S. Cl. ..................................... 358/10; 358/139; 358/13
[58] Field of Search ................. 358/10, 139, 13, 23

[56] References Cited

U.S. PATENT DOCUMENTS 4,349,833  9/1982  Clarke .
4,718,018  1/1988  Sloane et al. .................... 358/10

FOREIGN PATENT DOCUMENTS 2151111  7/1985  United Kingdom .................. 358/23

OTHER PUBLICATIONS

Bellis et al., "Digital Coding and Blanking" IBA Technical Review (GB), No. 8, 9/76, pp. 63–76.
M. Swart "Video-Test-Signal Generator SPF2" News from Rohde & Schwartz, vol. 20, 1980.
Hashimoto et al., "Digital Separation and Reconstruction of NTSC Signals" IEEE Transactions, vol. Com-28, No. 7, 7/80, pp. 1085-1088.
Lang et al., "Testing Color Reproduction by Means of a Programable Color Bar Generator" SMPTE Journal, vol. 87, pp. 579-582, 1980.

*Primary Examiner*—David E. Harvey
*Attorney, Agent, or Firm*—Francis I. Gray

[57] ABSTRACT

A television signal generator which is fully digital has digital data stored in PROMs, one PROM for each component of the desired encoded television signal corresponding to luminance data and chrominance data. A system clock allows a signal address generator to fetch data from the PROMs. The chrominance data from the PROMs is mixed with appropriate digital representations of a sinusoidal function and a phase offset and is added to the luminance data. The combined digital signal is converted to analog, filtered and output as the desired encoded television signal.

2 Claims, 7 Drawing Sheets

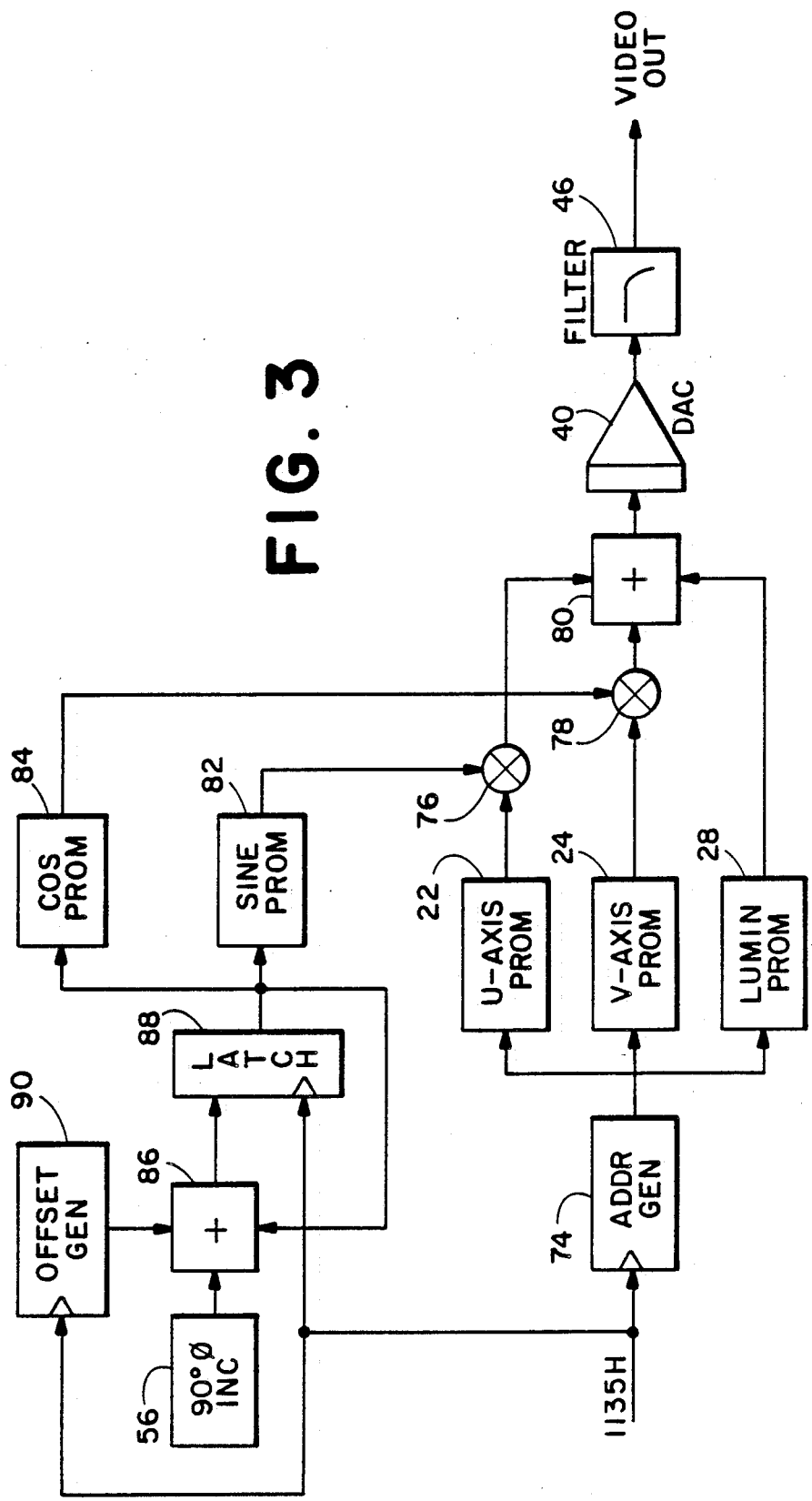

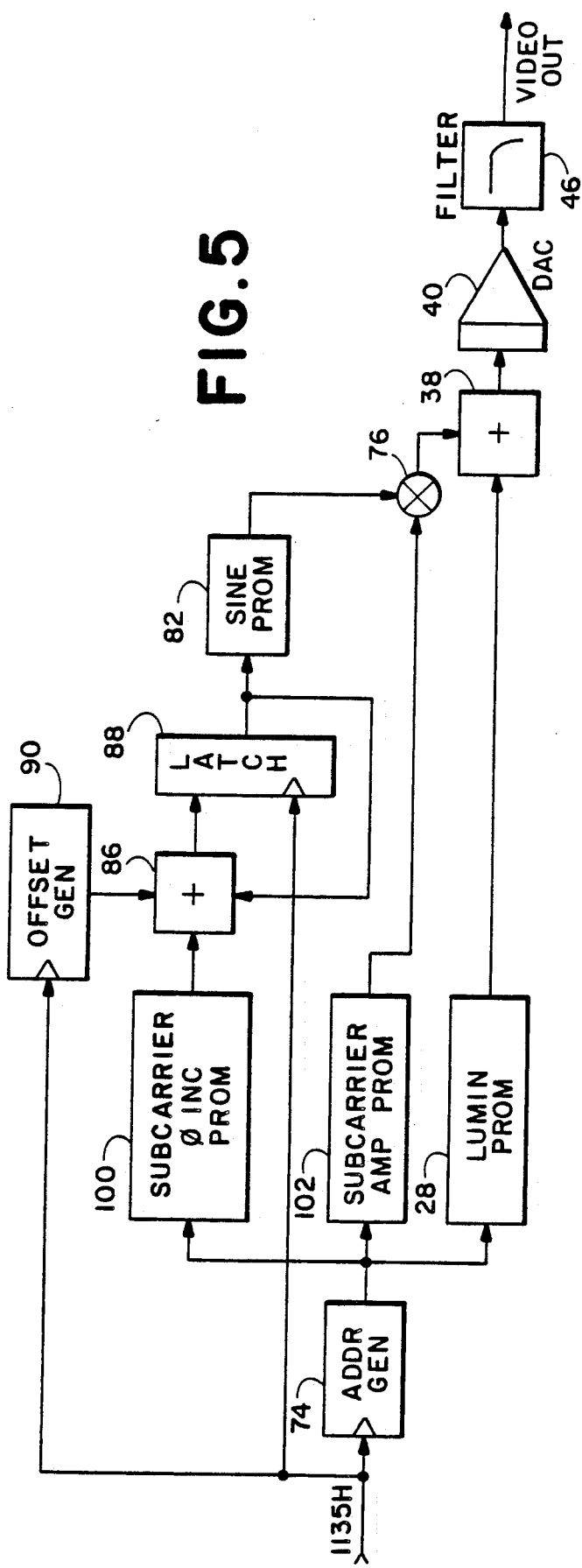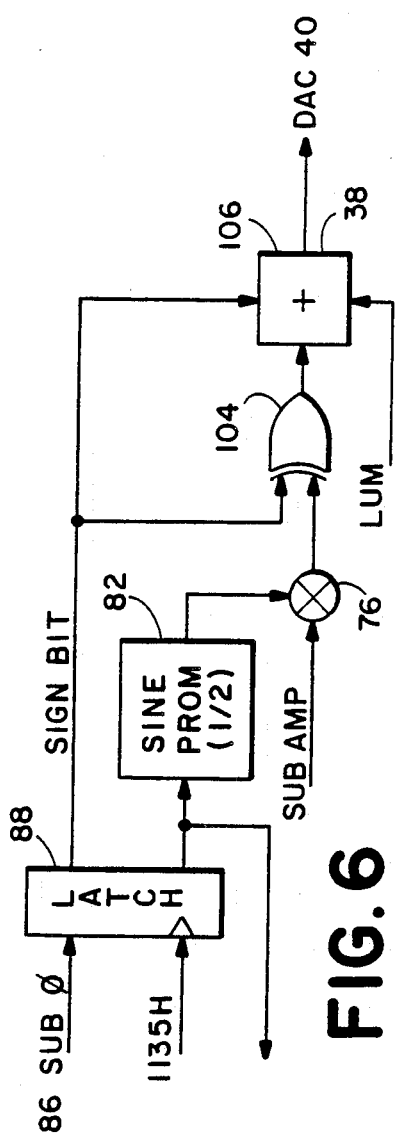

1

TELEVISION SIGNAL GENERATOR

This is a continuation of application Ser. No. 908,553 filed Sept. 17, 1986 and now abandoned.

BACKGROUND OF THE INVENTION

The present invention relates to signal generators, and more particularly to a television signal generator which is fully digital, uses a single system clock and a single digital to analog converter.

Prior television test signal generators, such as the 1410R Series sync and test signal generators manufactured by Tektronix, Inc. of Beaverton, Oreg., were analog. All of the signal components are generated with analog techniques Digital circuitry is used only to time and switch the analog components. Some of the problems with this architecture include imprecise subcarrier to horizontal (SCH) phase and residual subcarrier in the video output. However such analog techniques did allow for slewing of phase so that ringing of multiburst signals, caused typically by filters in a television system being tested, could be readily detected.

Another approach, as exemplified by the PM5630 test signal generator manufactured by Philips Denmark and the TSG300 component television generator manufactured by Tektronix, Inc., uses a digital component approach. The analog component generators are replaced with programmable read only memories (PROMs) followed by digital to analog converters (DACs) and low pass filters. The chrominance subcarrier is generated by modulating an oscillator running at the subcarrier frequency with the outputs of the chrominance component envelop DACs. The output of the luminance channel is summed with the modulated subcarrier to produce the test signal output. This architecture provides improved test signal flexibility, but the analog modulation scheme still leaves residual subcarrier and SCH error in the video output. Also due to the memory required to store separate patterns for each horizontal line to simulate phase slewing, such phase slewing capability is lost.

What is desired is a television signal generator which eliminates residual subcarrier and SCH error in the video output while maintaining a phase slewing capability without large memory expenditure.

SUMMARY OF THE INVENTION

Accordingly the present invention provides a television signal generator which is fully digital. Digital data stored in PROMs, one PROM for each of three components—luminance and two chrominance components, are used to generate desired encoded television signals. A system clock allows a signal address generator to fetch data from the PROMs. The chrominance data from the PROMs modulate digital representations of a sinusoidal function and a phase offset and are added to the luminance data. The combined digital signal representative of the desired encoded television signal is converted to analog, filtered and output as the desired encoded television signal.

The objects, advantages and other novel features of the present invention will be apparent from the following detailed description when read in conjunction with the appended claims and attached drawing.

BRIEF DESCRIPTION OF THE DRAWING

FIG. 3 is a block diagrammatic view of a third embodiment of a television signal generator according to the present invention.

FIG. 5 is a block diagrammatic view of a fourth embodiment of a television signal generator according to the present invention.

FIG. 6 is a block diagrammatic view of a fifth embodiment of a television signal generator according to the present invention.

DESCRIPTION OF THE PREFERRED EMBODIMENT

Figure 1:
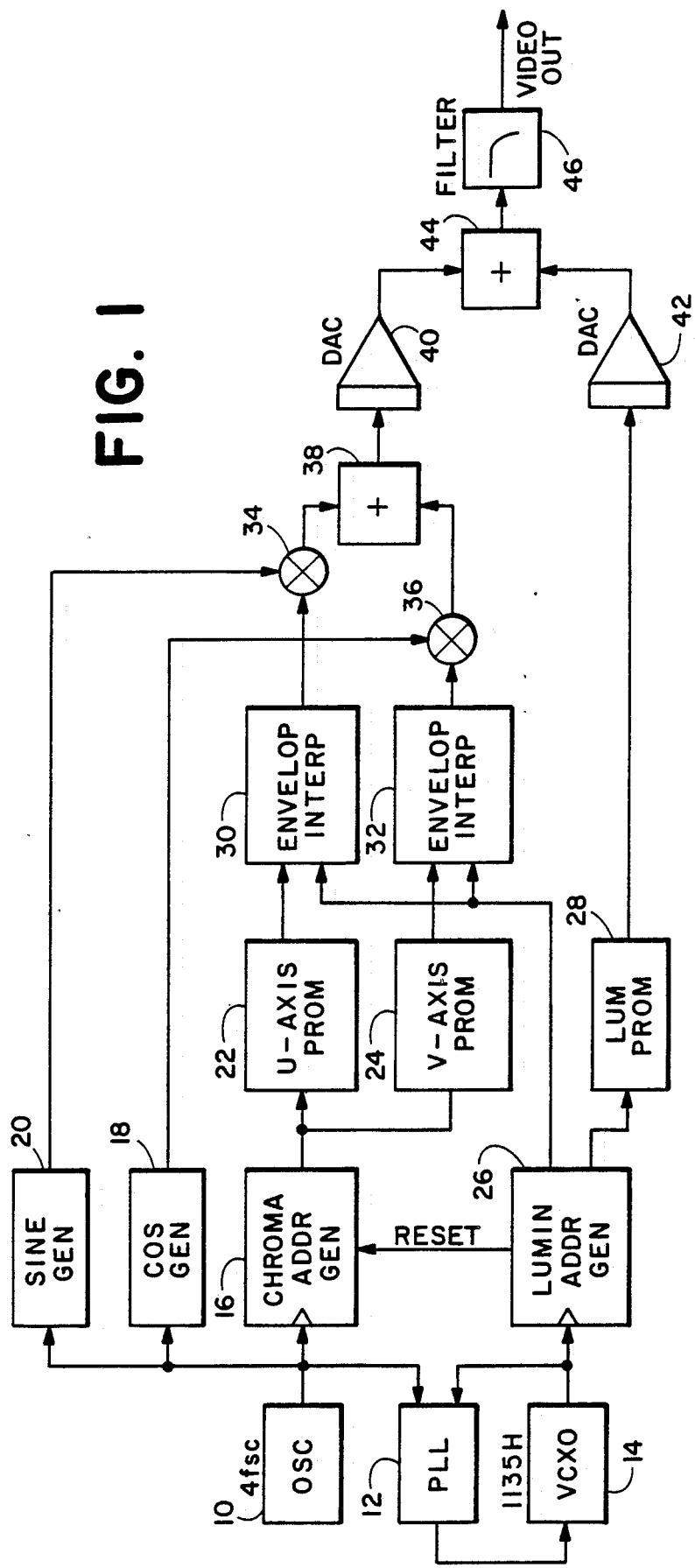
FIG. 1 is a block diagrammatic view of a first embodiment of a television signal generator according to the present invention.

Referring now to FIG. 1 a first embodiment of a television signal generator is shown using PAL color nomenclature and numerical values. A system clock 10 runs at four times the subcarrier frequency, $4f_{sc}$, and provides the timing for the generator circuits. The output of the system clock 10 is input to a phase locked loop 12 which controls a voltage controlled crystal oscillator (VCXO) 14 to produce a frequency at 1135 times the horizontal line rate. The output of the system clock 10 is also input respectively to a chrominance address generator 16, a digital sine wave generator 18 and a digital cosine wave generator 20. The sine and cosine generators 18, 20 produce digital representations of sine and cosine functions at the subcarrier frequency. The chrominance address generator 16 fetches data from a U-axis and a V-axis PROM 22, 24, respectively, at four times the subcarrier rate.

The output of the VCXO 14 clocks a luminance address generator 26 to fetch data from a luminance PROM 28 at a rate of 1135 sample points per horizontal line. The luminance address generator 26 also sends a reset signal to the chrominance address generator 16 at the beginning of each field. This prevents clock skew errors from accumulating and thereby minimizes SCH phase error.

Data fetched from the U-axis and V-axis PROMs 22, 24 pass through respective envelope interpolators 30, 32 which allow the subcarrier envelope data to be shifted slightly on a line-by-line basis. This is required for the PAL television system because the PAL subcarrier frequency is not an integer multiple of the horizontal scanning frequency. Thus the subcarrier envelope must be expanded by a total of four sample points every 625 lines. One way to implement the envelope interpolators 30, 32 is to store each envelope sample as two components—a starting point and a slope. On the first line of a frame the starting point value is passed through the envelope interpolator 30, 32 without any modification. For the next half field the envelope sample is computed by adding an offset to the starting point value. This offset value is a function of the starting point value, the slope and the line number. After half the field has been scanned the line one starting point of the subcarrier envelope is shifted by exactly one sample and the process described above is repeated. After the last line of field one the process repeats again with a resultant shift of exactly two samples. This same process continues through the second field, resulting in an expansion of the subcarrier envelope by exactly four sample points over a period of 625 lines.

After the U-axis and V-axis subcarrier data have been interpolated, they are multiplied by the digital representations of $Sin(F_{sc})$ and $Cos(F_{sc})$, respectively, by respective multipliers 34, 36. Since the resultant samples are clocked at $4f_{sc}$, envelope points may be chosen to simplify the sinusoidal generators 18, 20, i.e., SINE = 0, +1, 0, -1, ... and COS = +1, 0, -1, 0, ..., thereby also simplifying the multipliers 34, 36. The resultant data are then input to an adder 38 and the resulting output is passed through a DAC 40 to produce a modulated subcarrier. Data from the luminance PROM 28 is passed through a second DAC 42, and the two DAC outputs are input to a second adder 44. The resultant combined luminance and chrominance data is then passed through a low pass filter 46 to produce the video output. Since all chrominance data is produced digitally, residual subcarrier is eliminated. Also, the SCH error is less than in a fully analog comparator, but is not as stable as in a generator using a single DAC or an improved clock generator as described below.

Figure 2:
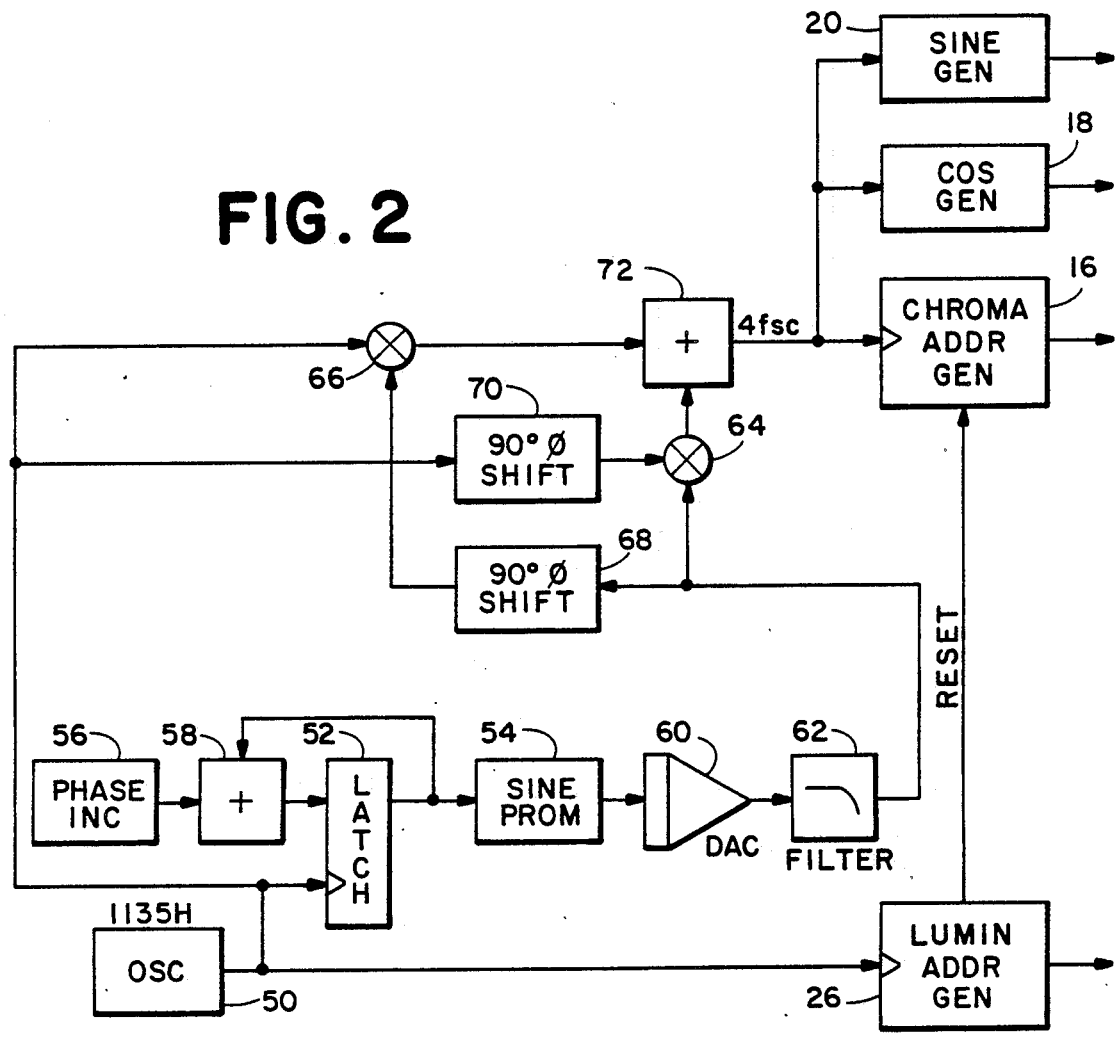
FIG. 2 is a block diagrammatic view of a second embodiment of a television signal generator according to the present invention.

As shown in FIG. 2 an improved technique is used to derive the four times subcarrier frequency from a clock 50 running at 1135 times the horizontal line rate. The clock 50 is used to increment an address pointer latch 52 into a PROM 54 which contains one cycle of a digitized sine wave. The length of the digitized sine wave is chosen to be a power of two so that, by using binary addition and ignoring carries, the address offsets "wrap around" from the end of the sine wave back to the beginning. A phase increment circuit 56 outputs a value which is summed in adder 58 with the output of the latch 52 and then input back into the latch to provide a new address pointer. The value of the phase increment is chosen such that the output of the sine PROM 54 is a digital representation of a 100 Hz sine wave. The data from the sine PROM 54 is sent to a DAC 60 and low pass filter 62, and is then mixed with the 1135H clock in a pair of balanced analog modulators 64, 66 and phase shifters 68, 70. This produces at the output of an adder 72 a resultant frequency of 1135 times horizontal line rate plus 100 Hz, exactly equal to four times the subcarrier frequency. The two clock signals, $4f_{sc}$ and 1135H, are input to the sine and cosine generators 18, 20 and to the chrominance and luminance address generators 16, 26 as described above with reference to FIG. 1. In this architecture the two clocks, $4f_{sc}$ and 1135H, are locked together without a phase locked loop, eliminating a lengthy divider chain, PLL phase jitter and SCH errors.

Another embodiment as shown in FIG. 3 uses a single clock at 1135H, eliminating the need to provide two precisely synchronized oscillators. The 1135H clock signal allows a signal address generator 74 to fetch samples from the U-axis, V-axis and luminance PROMs 22, 24, 28 at an 1135H rate. The U-axis and V-axis data are then digitally modulated by respective multipliers 76, 78 with digital representations of $Sin(F_{sc})$ and $Cos(F_{sc})$ and summed with the luminance data by adder 80. The resultant data is then passed through the DAC 40 and low pass filter 44 to produce the output video. Since all data are clocked at 1135H, only one DAC is required. The $Sin(F_{sc})$ and $Cos(F_{sc})$ data are generated by fetching data from a pair of PROMs 82, 84 which contain one cycle of digitized sine and cosine wave functions, respectively. Addresses for the sine and cosine PROMs 82, 84 are computed by summing at adder 86 the current address from a latch 88 with a fixed ninety degree phase increment from the phase increment circuit 56 and the output of an offset generator 90, the frequency of the offset generator being 25 Hz for PAL.

Figure 4:
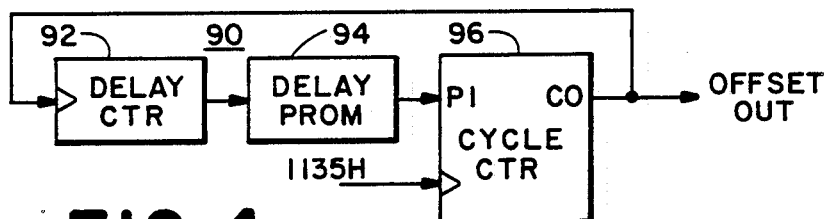
FIG. 4 is a block diagrammatic view of an offset generator for use in a television signal generator according to the present invention.

The offset generator 90 is shown in greater detail in FIG. 4. In the PAL television system the subcarrier frequency is defined as (1135/4) times the horizontal line rate plus 25 Hz. When the data is clocked at a rate of 1135H, this provides roughly four sample points per cycle of subcarrier. To produce the exact frequency required for the subcarrier, samples fetched from the sine PROM 82 must be slightly more than ninety degrees apart. In fact the 25 Hz offset can be thought of as adding an "extra" cycle of subcarrier during each period of 625 horizontal lines. To add this extra cycle, the offset generator 90 periodically increments the address of the sample being fetched from the sine PROM 82. As an example, for a sine PROM 82 containing a sine wave digitized into 4096 points and for 1135 points per horizontal line, there are 709,375 points per 625 line frame. To add the one extra subcarrier cycle every 625 lines, the offset generator 90 must produce a pulse every $709,375/4096 = 173.18726$ clock cycles. The offset generator 90 approximates this value by waiting 174 clock cycles between pulses 3/16 of the time and 173 clock cycles between pulses 13/16 of the time. This corresponds to an average time between pulses of 173.18725 clock cycles. The small residual error introduced by this approximation is cleared out once every four frames by resetting the sine PROM address latch 88 to zero degrees at the start of field one, line one.

The offset generator 90 has a delay counter 92 which addresses a delay PROM 94 in a modulo 16 manner. The delay PROM 94 contains sixteen integers. A cycle counter 96 counts clock cycles and is preloaded with data from the delay PROM 94. A carry output from the cycle counter 96 is generated after 173 clock cycles, causing the delay counter 92 to increment which in turn selects the next integer in the delay PROM 94 for preloading into the cycle counter 96. The integers in the delay PROM 94 are chosen such that thirteen of them provide a delay of 173 clock cycles between carry pulses and three of them provide a delay of 174 clock cycles between carry pulses, making the average time between pulses 173.1875 clock cycles.

An alternative architecture as shown in FIG. 5 produces the chrominance subcarrier by modulating the amplitude and phase of a digitized sine wave. With this approach all data is clocked at 1135H, only one digital multiplier is require-d and both chrominance and luminance data pass through a single DAC. Each signal to be generated is broken into three components —subcarrier phase increment, subcarrier amplitude and luminance, which components are stored in respective PROMs 100, 102, 28. The address generator 74 produces appropriate addresses to access the data in the respective PROMs 100, 102, 28. The chrominance subcarrier is generated by fetching samples from the sine PROM 82. By varying the sample rate and the number of addresses between subsequent samples a sine wave with arbitrary frequency and phase characteristics can be produced. The amplitude of the subcarrier is controlled by passing the output of the sine PROM 82 through digital multiplier 76. The address of the current sample to be fetched from the sine PROM 82 is computed by summing the previous address from the address latch 88 with the current data from subcarrier phase increment PROM 100 and the offset generator 90 at adder 86. The data from the sine PROM 82 is multiplied with the current data from the subcarrier amplitude PROM 102 to produce a chrominance subcarrier with the appropriate phase and amplitude attributes The subcarrier data is summed at adder 38 with the current data from the luminance PROM 28, the resulting data being passed through DAC 40 and low pass filter 46. The use of the phase increment PROM 100 provides the phase slewing desired to observe the envelope of frequency response signals, such as line sweep, multiburst and multipulse. The phase increment from the phase increment PROM 100 sets the frequency of the signal output sine wave and the amplitude from the amplitude PROM 102 modulates the envelope. By linearly varying the phase increment sample by sample a sine wave with a frequency which sweeps across the horizontal line as displayed on a waveform monitor is produced. Because the offset generator 90 causes a difference in phase on each line, when the television signal is displayed there appears to be negligible space between adjacent nodes of the sine wave and the envelope is readily apparent.

FIG. 6 shows an improved version of the architecture of FIG. 5 in that the sine PROM 82 contains only one-half cycle of a sine wave. The second half cycle is derived by addressing the first half cycle a second time and inverting the data. To make the second half cycle symmetric with the first an additional "1" is summed with the data at an adder 106 after the data has been inverted. With this method the most significant address bit from the address latch 88 becomes a sign bit and is passed around the multiplier 76 to an exclusive OR gate 104. The output of the multiplier 76 is also input to the exclusive OR gate 104, the output of the exclusive OR gate being the inverted data when the sign bit is "1". This configuration has the advantage of allowing an expensive NxN multiplier to generate data with N+1 bits of accuracy.

Figure 7:
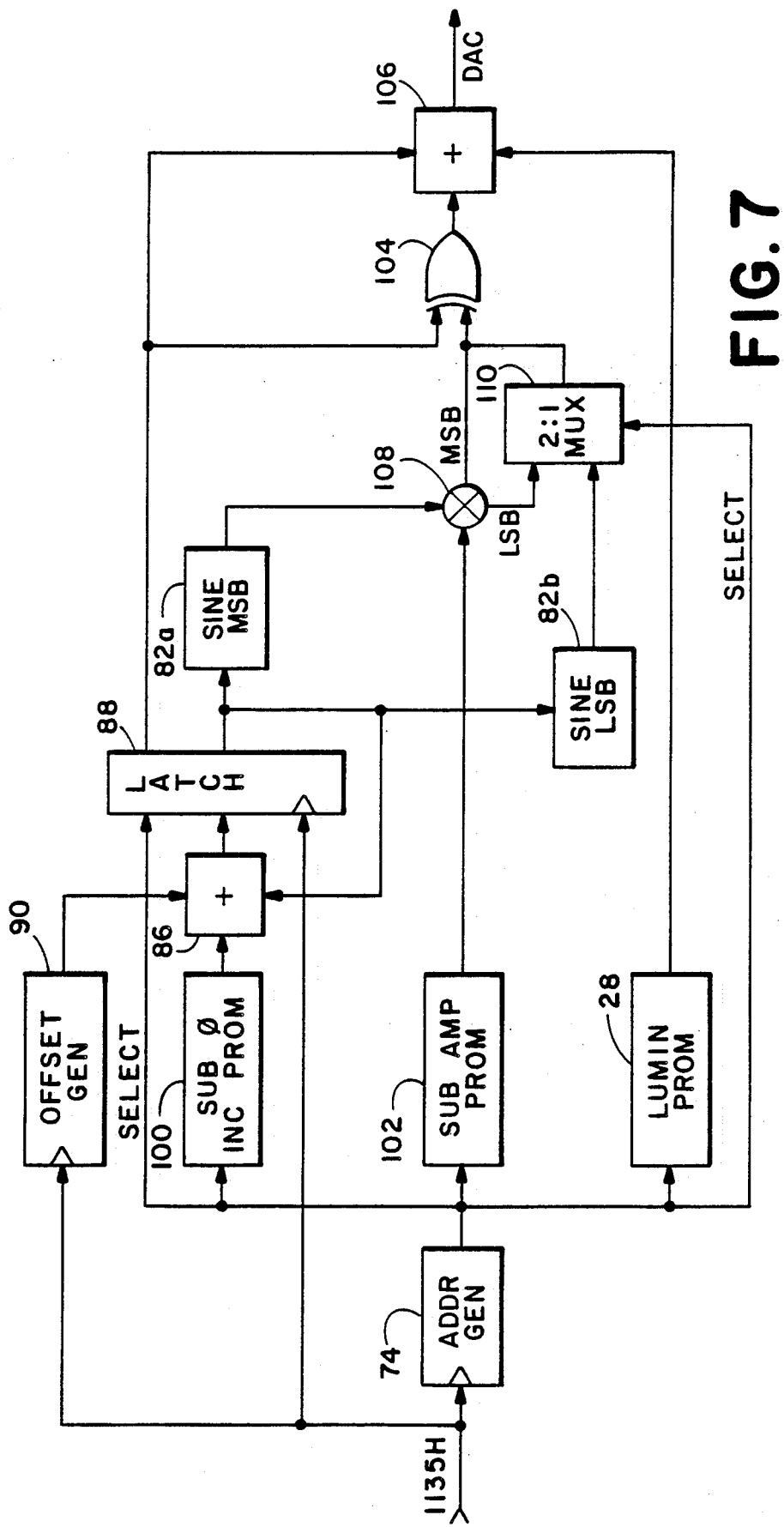
FIG. 7 is a block diagrammatic view of a sixth embodiment of a television signal generator according to the present invention.

Another version of this architecture is shown in FIG. 7. Here multiple half cycles of the sine wave are stored in the sine PROM 82, which is expanded into a MSB PROM 82a and a LSB PROM 82b. These cycles are scaled such that there is a separate half cycle of sine wave for each steady state subcarrier amplitude needed for the test signals to be generated. This provides improved resolution for subcarrier samples. During periods of steady state subcarrier amplitudes, MSB data is passed from the MSB PROM 82a directly through a multiplier 108, and LSB data from the LSB PROM 82b is provided via a multiplexer 110. During subcarrier amplitude transitions, the time duration of which is very small relative to the steady state intervals, reduced resolution is provided by ignoring the output of the LSB PROM 82b at multiplexer 110. A select signal from the address generator 74 determines the state of the multiplexer 110 as well as setting the address latch 88 to address both sine PROMs 82a, 82b or only the MSB PROM. This improves the amplitude resolution of the subcarrier during steady state portions of the television signal without the need for a higher resolution digital multiplier.

Figure 8:
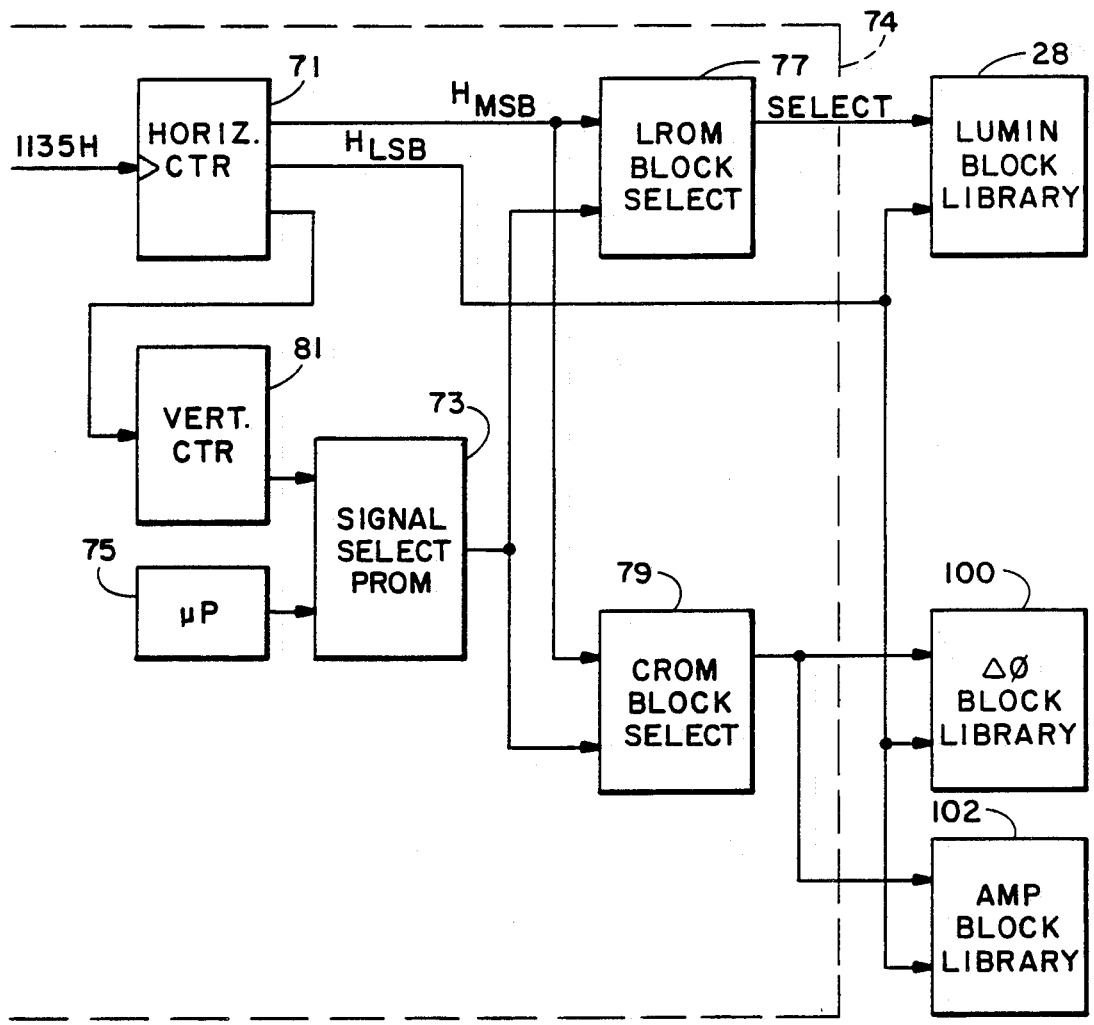
FIG. 8 is a block diagrammatic view of a portion of a signal address generator for a television signal generator according to the present invention.

A portion of the signal address generator 74 is shown in FIG. 8 as applied to the architectures of FIGS. 5-7. Respective PROMs 28, 100, 102 contain test signal data which is broken into blocks of sixteen samples. The four least significant address bits for these PROMs 28, 100, 102 are the four LSBs from a horizontal counter 71 which is clocked at 1135H. Thus data from the blocks of sixteen samples are accessed from these PROMs 28, 100, 102 at the 1135H rate. The upper address bits of these PROMs 28, 100, 102 are derived, respectively, from the outputs of an LROM and a CROM block PROMs 77, 79. These block select PROMs 77, 79 select which block of sixteen samples is being output by PROMs 28, 100, 102. The block select PROMs 77, 79 may be implemented with inexpensive EPROMs since they are accessed at one-sixteenth the 1135H sample rate. The addresses for the block select PROMs 77, 79 are derived from the most significant bits of the horizontal counter 71 and the output of a signal select PROM 73. The horizontal counter 71 bits are needed to allow "transition blocks" to be selected at the beginning and end of half lines. The signal select PROM 73 determines which signal appears on each horizontal line, therby allowing signals such as convergence to be stored as only two discrete horizontal lines. The signal select PROM 73 also allows several test signals to be matrixed into one test pattern. The signal select PROM 73 address is in turn derived from the output of a vertical counter 81 and a microprocessor 75. The microprocessor 75 selects which test signal or matrix of test signals is to be generated, while the vertical counter 81 determines which signal appears on each horizontal line. The signal select PROM 73 may also be implemented with an inexpensive EPROM since it is accessed at a vertical rate of once per 1135H.

Figure 9:
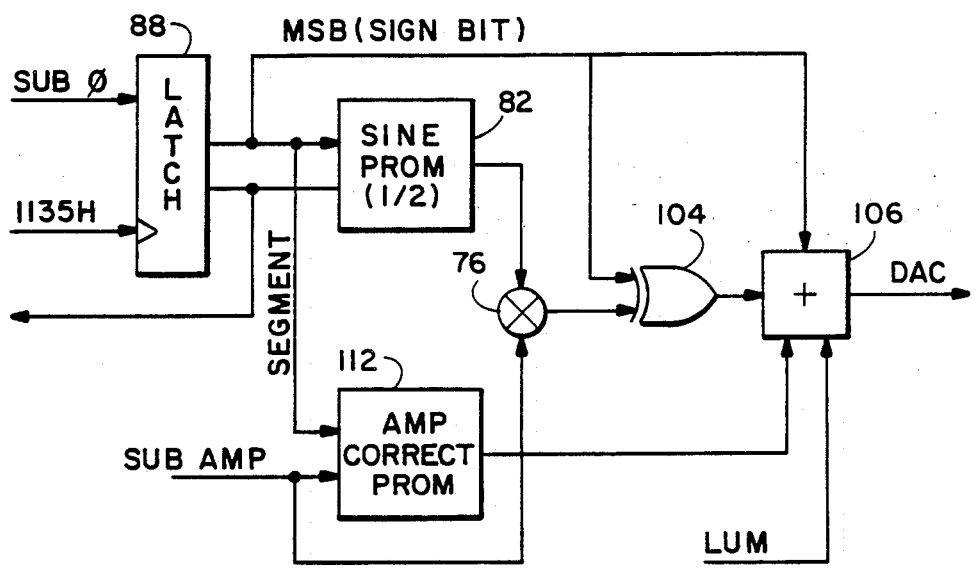
FIG. 9 is a block diagrammatic view of a seventh embodiment of a television signal generator according to the present invention.

Another way for improving the resolution of the subcarrier, as shown in FIG. 9, is to divide a single half cycle of sine wave stored in the sine PROM 82 into multiple segments with the amplitude of each segment offset from zero by some integer number. Data is fetched from the sine PROM 82 and passed through the multiplier 76 just as in FIG. 6. However the output from the multiplier 76 via exclusive OR gate 104 is now summed at adder 106 with the output from an amplitude correction PROM 112 which contains data which is equal to the appropriate amplitude offset multiplied by the current data from the subcarrier amplitude PROM 102. The amplitude resolution using this scheme is improved without the need for a higher resolution digital multiplier, and improves amplitude resolution for subcarrier transition regions as well as steady state regions.

Figure 10:
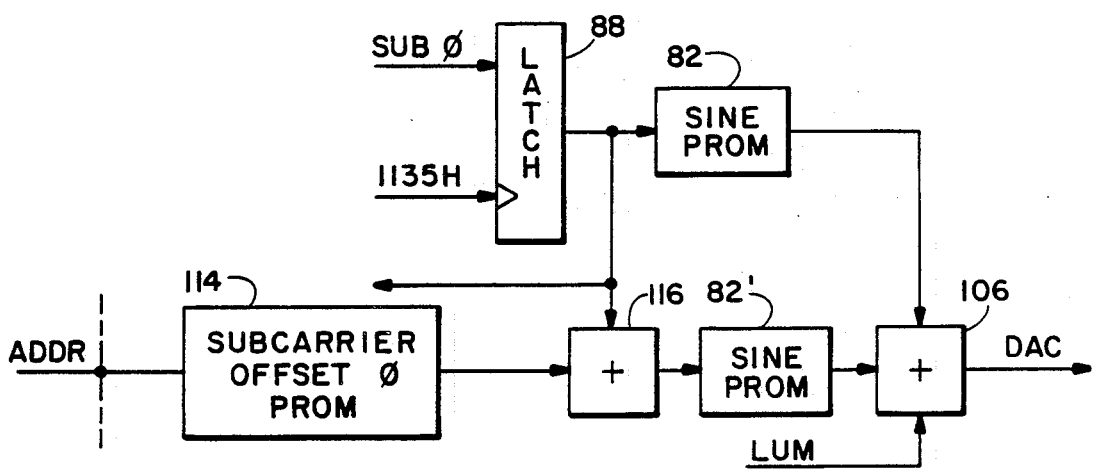
FIG. 10 is a block diagrammatic view of a eighth embodiment of a television signal generator according to the present invention.

A further approach to the generation of television signals is shown in FIG. 10. In this arrangement the component of the television signal corresponding to the subcarrier amplitude is replaced with a subcarrier phase offset component stored in an offset PROM 114. In this arrangement the amplitude of the subcarrier is adjusted by summing the subcarrier at adder 106 with a second sine wave from a second sine PROM 82' that has been offset in phase by adding an increment from the offset PROM 114 at adder 116 to the address from latch 88. By varying the phase offset from zero to 180 degrees, a resultant sine wave is produced at the output of the adder 106 which can be varied in amplitude from zero to twice the maximum value stored in each sine PROM 82, 82'. In this way the resolution of the subcarrier amplitude can be increased indefinitely without the need for any digital multiplier.

Thus the present invention provides a television signal generator which eliminates residual subcarrier and SCH errors in the signal video output by using a fully digital approach for generating the signal components and for modulating the subcarrier.

What is claimed is:

1. A television signal generator comprising:
   means for storing digital components for a desired television signal, two digital components representing chrominance data and being in the form of phase increments for a first chrominance data component and in the form of amplitude values for a second chrominance data component, and a third digital component representing luminance data;
   means for addressing the three digital components in the storing means at a common system clock rate; and
   means for combining the addressed digital components to form the desired television signal.

2. A television signal generator comprising:
   means for storing digital components for a desired television signal, two digital components representing chrominance data and being in the form of phase increments for a first chrominance data component and in the form of subcarrier phase offset values for a second chrominance data component, and a third digital component representing luminance data;
   means for addressing the three digital components in the storing means at a common system clock rate; and
   means for combining the addressed digital components to form the desired television signal.

* * * * *